Feb. 3, 1959　　　　　A. BLANCHARD　　　　2,872,637
ELECTRICAL RESISTIVITY WELL LOGGING METHODS AND APPARATUS
Filed July 29, 1953　　　　　　　　　　　　　　　2 Sheets-Sheet 1
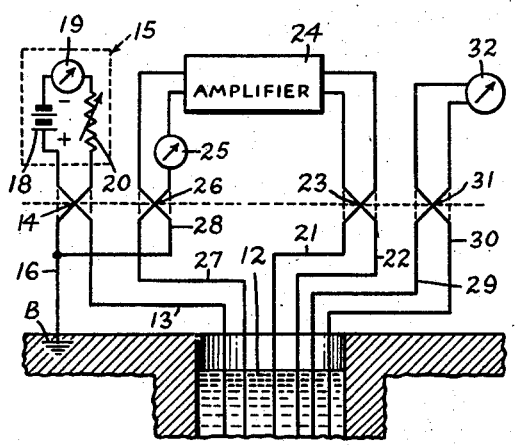
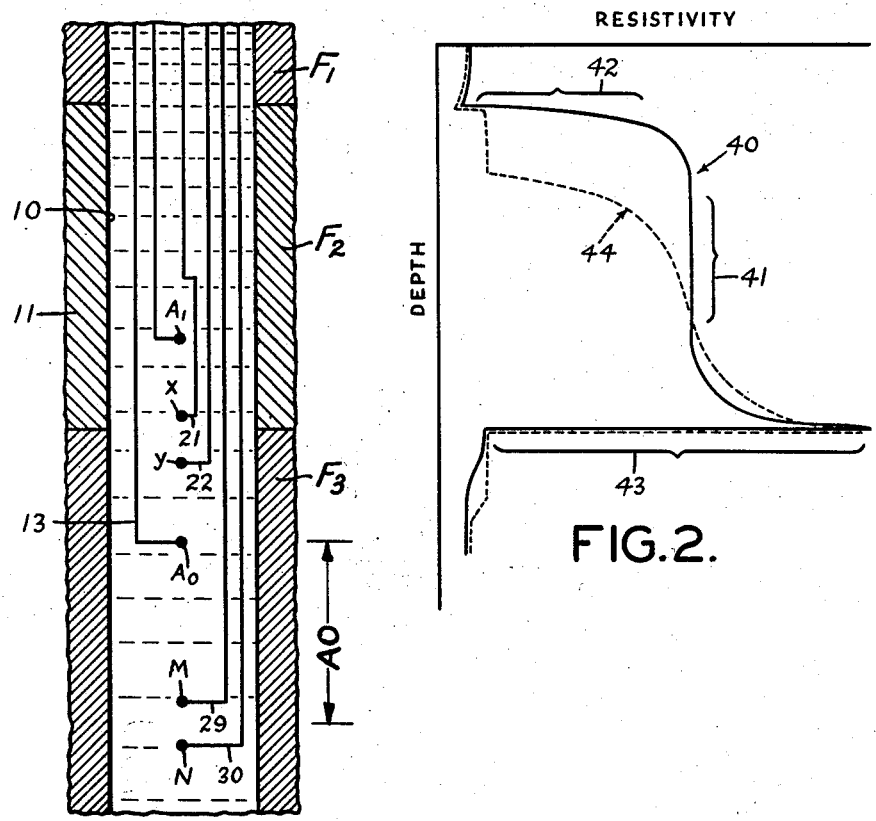
INVENTOR.
ANDRE BLANCHARD
BY
Campbell, Brumbaugh, Free & Graves
HIS ATTORNEYS.

Feb. 3, 1959 A. BLANCHARD 2,872,637
ELECTRICAL RESISTIVITY WELL LOGGING METHODS AND APPARATUS
Filed July 29, 1953 2 Sheets-Sheet 2
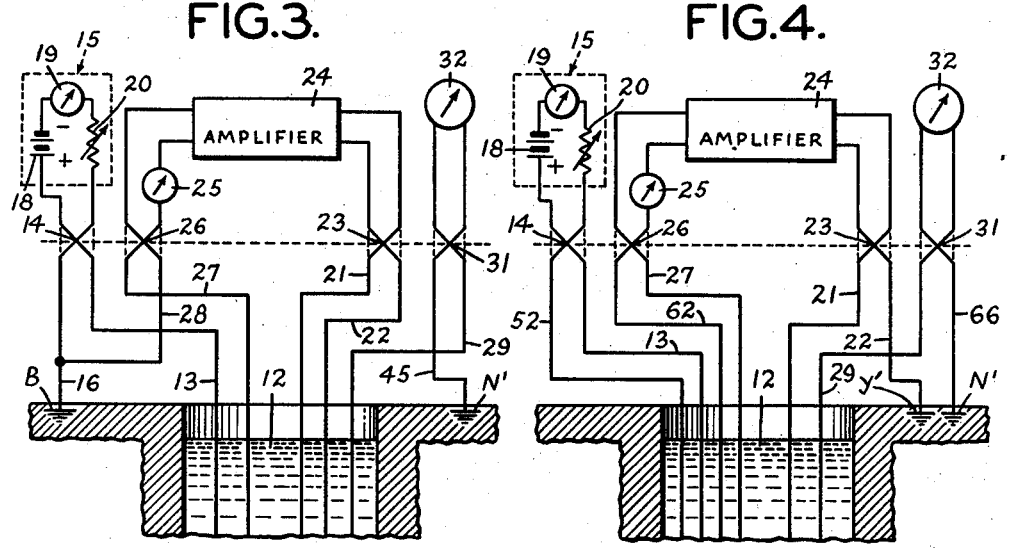
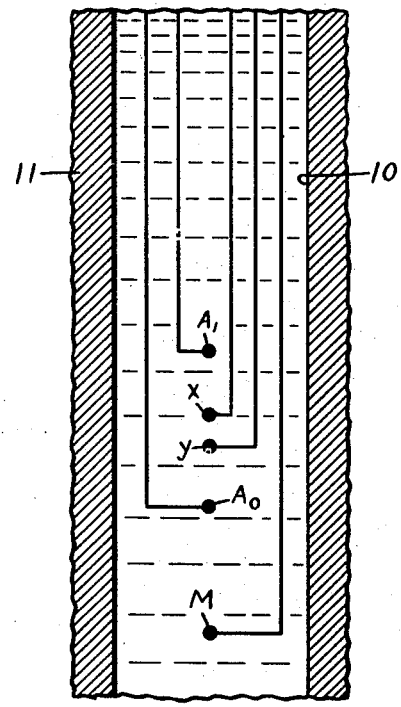
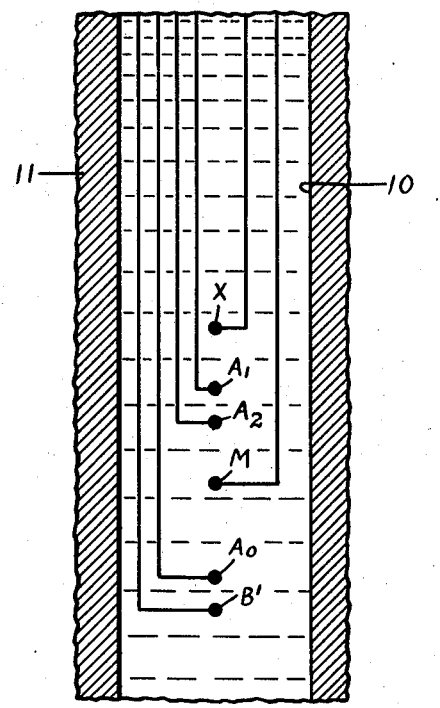
INVENTOR.
ANDRE BLANCHARD
BY
HIS ATTORNEYS.

United States Patent Office 2,872,637
Patented Feb. 3, 1959

2,872,637

ELECTRICAL RESISTIVITY WELL LOGGING METHODS AND APPARATUS

Andre Blanchard, Houston, Tex., assignor, by mesne assignments, to Schlumberger Well Surveying Corporation, Houston, Tex., a corporation of Texas Application July 29, 1953, Serial No. 371,036

17 Claims. (Cl. 324—1)

This invention relates to electrical resistivity well logging and, more particularly, pertains to improved methods and apparatus for deriving resistivity logs from which accurate information regarding the characteristics of the earth formations traversed by a bore hole or well may be obtained.

It is common practice to log the earth formations traversed by a bore hole in terms of electrical resistivity versus depth. In many instances, such logs are produced by emitting current from an electrode that is moved through the bore hole and recording variations in the potential difference between a potential electrode located near the current electrode and another point, the entire assembly being moved through the bore hole and such variations being continuously recorded. The present invention is directed to certain improvements in this type of electrical resistivity well logging methods and apparatus.

It is an object of the present invention to provide novel methods and apparatus for logging the electrical resistivity of earth formations traversed by a bore hole which enable logs to be obtained that are more accurately representative of the true formation resistivities than can be made with equipment of the type described above.

Another object of this invention is to provide new and improved well logging methods and apparatus of the above character that are capable of delineating the boundaries of earth formations along the bore hole with greater accuracy than is possible with the aforementioned apparatus of the prior art.

These and other objects of the invention are attained by providing principal current emitting electrode means in the bore hole together with additional means for plugging the hole electrically at a nearby location against current flow in one longitudinal direction. This is accomplished by adjusting the intensity of current emitted by auxiliary electrode means, disposed in the bore hole in the vicinity of the principal electrode means, to obtain a potential gradient of substantially zero longitudinally of the bore hole at such location. As a result, the current flow from the principal electrodes means will be restricted to the space on the same side of the zero potential gradient location as the principal electrode means.

In a preferred embodiment of this invention, a pair of electrodes are disposed at the location where the potential gradient is maintained at zero and any potential difference between such pair of electrodes is sensed by means that adjust the current flow through the auxiliary electrode means to reduce such potential difference to a null or zero value.

Indications of the electrical resistivities of the formations traversed by a bore hole at different depths are obtained by logging the potential difference between a reference electrode positioned in the bore hole or at the surface of the earth and a measuring electrode in the path of the current flowing from the principal electrode means.

Further objects and advantages of the present invention will become apparent when the following detailed description is read in connection with the accompanying drawings in which:

Fig. 1 is a schematic diagram of an electrical resistivity logging system embodying the present invention disposed in a bore hole;

Fig. 2 illustrates a typical log produced by the apparatus of Fig. 1;

Fig. 3 is a schematic diagram of a modified electrical resistivity logging system embodying the present invention; and Fig. 4 is a schematic diagram of still another embodiment of the invention.

In the representative form of the invention shown in Fig. 1, which is based on the conventional logging system disclosed in Schlumberger Patent No. 1,819,923, the well logging system comprises a principal current electrode $A_0$ disposed in a bore hole 10 traversing earth formations 11, and containing a column of more or less conducting liquid 12 such as drilling mud, for example. The electrode $A_0$ is connected by an insulated conductor 13 in a supporting cable (not shown for simplicity) and by a polarity reversing commutator 14 to a source of electrical energy 15 at the surface of the earth. This circuit is completed through the commutator 14 and a conductor 16 connected to a ground point B remote from the electrode $A_0$, preferably at the surface of the earth as shown.

The source of electrical energy 15 may comprise, for example, a battery 18 connected in series with a current indicating instrument 19 and a variable resistance 20 having a relatively high value, in order to provide current of substantially constant amplitude. Thus, due to the commutator 14, pulsating current of essentially constant maximum amplitude flows through the electrode $A_0$ into the earth formations 11.

In order to provide the distribution of the current flowing from the electrode $A_0$ characteristic of the invention, the bore hole 10 must be electrically plugged at a location in the vicinity of the electrode $A_0$. Such plugging may be accomplished by employing a pair of potential electrodes $x$ and $y$ disposed above the electrode $A_0$ in vertically spaced relation and connected by insulated conductors 21 and 22, respectively, and a polarity-reversing commutator 23 to the input circuit of a conventional amplifier 24. The commutator 23 is operated synchronously with the commutator 14 and is phased to function as a rectifier, converting the voltage of rectangular wave form derived at the electrodes $x$ and $y$ to a unidirectional potential. The output current of the amplifier 24, controlled by the unidirectional input potential, flows through a current indicating meter 25, another polarity reversing commutator 26, operated synchronously with the commutators 14 and 23, and an insulated conductor 27 to an auxiliary current electrode $A_1$ disposed in the bore hole above the electrodes $x$ and $y$. The return circuit includes the ground point B, the conductor 16, a conductor 28 and the commutator 26. The phasing of the current supplied through the electrode $A_1$ is adjusted with respect to the current supplied to the electrode $A_0$ so that it tends to reduce the potential difference between the electrodes $x$ and $y$.

The amplifier 24 is designed to provide ample power output to the circuit including the electrode $A_1$ to maintain the potential difference between the electrodes $x$ and $y$ substantially at zero. Preferably, the amplifier 24 is of conventional electronic amplifier design. Alternatively, a mechanical servo system may be employed in the system. Thus, a motor responsive to the potential between electrodes $x$ and $y$ may be arranged to vary a rheostat connected in a circuit including a source of power and the electrode $A_1$.

The electrical resistivities of the earth formations 11 traversed by the bore hole 10 may be accurately logged by obtaining indications of the potential difference between an electrode M, positioned below the current electrode $A_0$, and a reference electrode N, vertically displaced below the electrode M. To obtain such potentials, the electrodes M and N are connected by insulated conductors 29 and 30, respectively, and another polarity reversing commutator 31, operating synchronously and in such phase relation with the commutators 14, 23 and 26 that it functions as a rectifier, to a voltmeter 32, preferably of the recording type. The meter 32 may be calibrated to indicate resistivity directly if the current from the source 15 is of constant amplitude.

In a typical operation of this embodiment of the invention, the current supplied from the source of electrical energy 15 to the principal current electrode $A_0$ is adjusted to a desired value and is preferably, although not necessarily, maintained constant during the logging operation. The electrode system is lowered through the bore hole by any conventional winch and cable, not illustrated for simplicity, customarily employed for this purpose. As the electrode assembly is moved through the bore hole, any potential difference appearing between the electrodes $x$ and $y$ causes the amplifier 24 to furnish current to the auxiliary current electrode $A_1$ tending to reduce such potential difference to zero.

Thus, regardless of the relative electrical resistivities of the surrounding earth formations 11 or of the resistivities of the formations with respect to the conductive bore hole liquid 12, practically no current from the principal current electrode $A_0$ will flow in an upward direction along the bore hole 10. Instead, the current emitted by the electrode $A_0$ will flow into the earth formations 11 in a substantially hemispherical pattern below a horizontal electrical reference plane defined by a point intermediate the electrodes $x$ and $y$. In other words, the bore hole 10 is effectively plugged at the level of the electrodes $x$ and $y$, and by suitably spacing the electrodes $A_0$ and $A_1$, this electrical plug will extend beyond the sidewall of the bore hole 10 a considerable distance into the earth formations 11.

Inasmuch as the current flow from the electrode $A_0$ is effectively limited to the formations below the horizontal electrical reference plane at the electrodes $x$ and $y$, the potential difference between the measuring electrode M and the reference electrode N will be determined primarily by the potential drop in the earth formations 11 surrounding the bore hole 10 below the electrical reference plane. Accordingly, a more accurate indication of formation resistivity will be obtained, than is possible with the system disclosed in the aforementioned Patent No. 1,819,923.

In considering the principles of operation of this embodiment of the invention, it will be helpful to assume an operating condition wherein the electrode array is positioned along the bore hole 10 so that the electrical reference plane coincides with the upper boundary of a thick formation, i. e., a formation having a vertical thickness much greater than the distance between the electrode $A_0$ and a point intermediate the electrodes M and N, commonly referred to as the AO spacing. In the following analysis, it is assumed that the bore hole 10 is of infinitely small diameter and may be neglected.

These conditions are assumed: the bed under consideration is of infinite thickness and has a resistivity $\rho_1$; the adjacent bed above has a resistivity $\rho_2$; the current flowing from the electrode $A_0$ is $i_0$; the potential gradient between the electrodes $x$ and $y$ is zero; and the electrodes $x$ and $y$ are disposed exactly midway between the electrodes $A_0$ and $A_1$. Under such conditions, it may be shown that the relationship between the current $i_0$ flowing from the electrode $A_0$ and the current $i_1$ flowing from the electrode $A_1$ is:

$$i_0 = \frac{\rho_2 - \rho_1}{\rho_2 + \rho_1} i_0 + \frac{2\rho_2}{\rho_2 + \rho_1} i_1 \quad (1)$$

or $$i_0 = \frac{\rho_2}{\rho_1} i_1 \quad (2)$$

It is obvious that if the resistivities $\rho_1$ and $\rho_2$ of the adjoining formations and the currents $i_0$ and $i_1$ are equal, a horizontal reference plane intermediate the electrodes $x$ and $y$ on the boundary of the formations will be formed since the potential gradient on such boundary will be zero. Further, since substantially all of the current $i_0$ flows below such reference plane, the voltage between the electrodes M and N disposed below the plane will be primarily determined by the current $i_0$ and the formation resistivity $\rho_1$. Carrying this reasoning a step further, if the formation resistivities are different, but $i_1$ is adjusted so that the horizontal reference plane is formed intermediate the electrodes $x$ and $y$, the voltage between the electrodes M and N will behave in the same manner as it did when $i_0$ was equal to $i_1$. But when this occurred, the resistivities of the formations were equal. Consequently, the voltage obtained between the electrodes M and N will be the same as though the electrode array were disposed in a homogeneous medium having a resistivity $\rho_1$ and will provide an accurate indication of such resistivity. Furthermore, when the voltage between the electrodes M and N acts as though $i_0$ and $i_1$ are equal, $\rho_1$ must equal $\rho_2$ to satisfy Equation 2.

In conventional electrical resistivity logging, the presence of adjacent formations having different resistivities provides an apparent resistivity which is different from the true resistivity. However, since the logging system of the invention measures the resistivity of a formation as though the electrode array were in a homogeneous medium as explained above, the presence of an adjacent formation does not substantially influence the resistivity indications. Therefore, a more accurate measure of the formation resistivity is possible.

Another important advantage of electrical resistivity logging according to the present invention is apparent in the log shown in Fig. 2. This log represents a formation $F_2$ (Fig. 1) having a thickness slightly greater than the AO spacing of the electrode array and a true resistivity eight times the resistivity of each of the adjacent upper and lower earth formations $F_1$ and $F_3$, respectively.

In Fig. 2, the solid line curve 40 was obtained with apparatus of the type illustrated and described in connection with Fig. 1. This curve includes a section 41 of essentially constant resistivity which is easily and accurately identifiable as the resistivity of the formation under consideration. It is apparent that the curve 40 includes two relatively long and substantially parallel sections 42 and 43, which clearly define the upper and lower boundaries of the earth formation under consideration.

To fully appreciate the advantages contributed by the present invention to the electrical resistivity logging art, it will be helpful to consider a log produced by the use of conventional equipment such as that described in the Patent No. 1,819,923 to Schlumberger. The equipment disclosed therein employs certain elements found in the apparatus of Fig. 1, such elements corresponding to the electrodes $A_0$, M and N, the source 15 and the indicator 32, but it does not include the counterparts of the electrodes $A_1$, $x$ and $y$, or the amplifier 24.

When such a logging system is utilized, the dashed curve 44 shown in Fig. 2 is derived when the spacing between the electrode $A_0$ and a point intermediate electrodes M and N is the same as the spacing of similar electrodes in the electrode array shown in Fig. 1. Curve 44 is a plot of resistivity versus depth for the same formation represented by the curve 40, but it is at once apparent that the curve 40 presents a more accurate indication of the resistivity of the formation under consideration. Especially is this true as regards the more precise delineation of the upper boundary of the formation as compared with the curve 44.

If it is desirable to eliminate some of the conductors in the supporting cable, the amplifier 24 may be contained in a suitable cartridge adapted to traverse the bore hole 10 with the electrode array. In this alternative arrangement, the resistance 20 may also be disposed in the cartridge in series circuit relation with the conductor 13 and the electrode $A_0$. The electrodes $x$ and $y$ may be directly connected to the input circuit of the amplifier 24, its output circuit then being connected to the electrode $A_1$ and to the junction of the resistor 20 and the cable conductor 13. This arrangement is well suited to a system in which the source 15 and the commutator 14 are replaced by an alternating current source. In such an event, a conventional rectifier may be utilized in the place of the commutator 31.

It should also be understood that although alternating current has been described in connection with the embodiment of the invention illustrated in Fig. 1, direct current may be substituted therefor. Furthermore, whether the source be alternating or unidirectional, it need not supply a current of constant maximum amplitude if a quotient meter is employed to replace the meter 32, such quotient meter being supplied with the current flowing in the conductor 13 or through the commutator 14 to the point B and the potential between the electrodes M and N. Thus, the variations in potential between the electrodes M and N will be divided by the current supplied by the source 15 to provide an indication of the formation resistivity.

While the ground point B has been disclosed at the surface of the earth in Fig. 1, in accordance with conventional practices a return in the bore hole 10 may be employed. If such a return is desirable, the conductor 16 may be connected to an electrode arranged to traverse the bore hole 10 together with the electrode array and positioned at a distance therefrom to effectively function as though it were electrically remote.

In the analysis considered earlier in connection with the Equations 1 and 2, it was assumed that the monitoring electrodes $x$ and $y$ are midway between the current electrodes $A_0$ and $A_1$. While these equations apply to such an illustrative example of a system embodying the invention, it is within the scope of this invention to arrange the electrodes $x$ and $y$ in other positions relative to the current electrodes. Furthermore, if expedient, the entire electrode array shown in Fig. 1 may be inverted in the bore hole.

The embodiment of the invention shown in Fig. 1 may be constructed to have an AO spacing (i. e., the distance from the electrode $A_0$ to the midpoint between the electrodes M and N) of 18 feet, a distance between the electrode $A_0$ and $A_1$ of 4 to 8 feet, and a distance between the electrodes $x$ and $y$ of between one and two times the bore hole diameter, which usually is about 8 inches on the average. For measuring the resistivity of limestone formations, the AO spacing may be 32 inches and the remaining dimensions suitably apportioned. It is evident, of course, that these dimensions are presented by way of illustration only and are not to be construed as limiting the scope of the invention.

A modification of the electrical resistivity logging system of Fig. 1 is illustrated in Fig. 3, the circuit connections being in many respects the same as those shown in Fig. 1 with the corresponding elements being designated by like reference characters. In this embodiment of the invention, the counterpart of the electrode N in the bore hole 10 is a remote reference point N' preferably at the surface of the earth. Of course, this reference point may be positioned in the bore hole electrically remote from the electrode M. The meter 32 is connected through the commutator 31 and the cable 29 to the electrode M and also through the commutator 31 and a conductor 45 to the reference point N'.

The operation of the embodiment of the invention shown in Fig. 3 is substantially the same as that described in connection with Fig. 1. The bore hole 10 is effectively plugged along an electrical reference plane extending horizontally between the electrodes $x$ and $y$ and consequently, the resistivity of the formations above this plane will have little or no effect on the potential measurements obtained between the electrode M and the reference point N'. Obviously, all of the modifications described in connection with Fig. 1, including the substitution of a mechanical servo mechanism for the amplifier or the employment of the amplifier 24 in a cartridge with the electrodes, may be employed in this apparatus.

A further resistivity logging system in accordance with the invention is shown in Fig. 4. Since the apparatus employed in Fig. 4 is similar to that described in connection with Fig. 1, elements corresponding to those found in Fig. 1 are designated by like reference characters. The source of current 15 is connected between the principal current emitting electrode $A_0$ and an electrode B' through the commutator 14 and the potential electrode $x$ and a potential electrode $y'$ are connected to the input of the amplifier 24 by the conductors 21 and 22 and the commutator 23. The electrode $x$ is disposed in the bore hole while the electrode $y'$ is located at the surface of the earth.

The output current from the amplifier 24 is supplied through the commutator 26, the conductor 27 and an insulated conductor 62 to a pair of current electrodes $A_1$ and $A_2$, respectively, interposed between the electrodes $A_0$ and $x$. Any potential difference between the electrodes $x$ and $y'$ is fed to the amplifier 24 which supplies current to the electrodes $A_1$ and $A_2$ to reduce such potential to a zero or null value. In order to determine the resistivity of the earth formations 11 traversed by the bore hole 10, the measuring electrode M may be disposed between the electrodes $A_0$ and $A_2$ and connected to the voltmeter 32 by the conductor 29. This meter is also tied electrically by a conductor 66 to the reference point N', preferably at the surface of the earth as shown in Fig. 4. Of course, the point N' may be located in the bore hole electrically remote from the other electrodes therein.

In the operation of this representative form of the invention, resistivity indications are provided at the meter 32 dependent primarily on the resistivity of the earth formations below a horizontal plane passing through the electrode M and substantially independent of the resistivity of the formations above the plane. Thus, the embodiment of the invention illustrated in Fig. 4 provides essentially the same results and advantages found in connection with the arrangement illustrated in Fig. 1.

It is apparent, therefore, that the methods and apparatus of the invention provide electrical resistivity logs indicating with greater accuracy the resistivity values of earth formations and more precisely delineating the boundaries between adjacent formations.

Obviously, the several representative modifications described above and illustrated in the drawings can be considerably modified within the spirit of the invention and thus, the specific embodiments disclosed herein are not to be regarded as limiting in any way of the scope of the appended claims.

I claim:

1. In a method for investigating the electrical resistivity of earth formations traversed by a bore hole containing a column of electrically conductive liquid, the steps of establishing a first electrical current distribution of known or constant intensity in one part of a given zone including a portion of the bore hole and surrounding formations, said first current distribution having a component directed longitudinally of the bore hole, establishing a second electrical current distribution in another part of said zone, said second current distribution having a component directed longitudinally of the bore hole the magnitude and polarity of which is selected to reduce substantially to zero the potential difference between a point in said zone and a reference point longitudinally spaced apart therefrom, and obtaining indications of potential difference between a reference point and a location in the path of said first current distribution that is longitudinally spaced apart from said last-named reference point, neither said location nor said point being at the same potential as said point in said zone.

2. In a method for investigating the electrical resistivity of earth formations traversed by a bore hole containing a column of electrically conductive liquid, the steps of passing current of known or constant intensity between one location in the bore hole and a point remote from said one location and longitudinally spaced apart therefrom, altering the electric field associated with said current at another location in the bore hole spaced from said one location in a direction longitudinally of the bore hole so as to impede materially the flow of said current along the bore hole in the direction of said another location, and obtaining indications of the potential difference between a reference point and a longitudinally spaced point separated from said another location by said one location.

3. In a method for investigating the electrical resistivity of earth formations traversed by a bore hole containing a column of electrically conductive liquid, the steps of passing current of known or constant intensity between one location in the bore hole and a remote point longitudinally spaced apart therefrom, picking up the potential difference between two longitudinally spaced apart points in the bore hole near said one location, reducing the potential difference between said two points substantially to zero by passing current between another location in the bore hole and a remote point longitudinally spaced apart therefrom, and obtaining indications of the potential difference between a reference point and a point in the bore hole separated longitudinally from said two spaced apart points by one of said locations.

4. In a method for investigating the electrical resistivity of earth formations traversed by a bore hole containing a column of electrically conductive liquid, the steps of passing current of known or constant intensity between two longitudinally spaced locations in the bore hole, picking up the potential difference between a point in the bore hole and a remote point, reducing the potential difference between said two points substantially to zero by passing current between two other longitudinally spaced locations in the bore hole, and obtaining indications of the potential difference between a point in the vicinity of said locations and a reference point substantially at ground potential.

5. In a method for investigating the electrical resistivity of earth formations traversed by a bore hole containing a column of electrically conductive liquid, the steps of passing current of known or constant intensity between two longitudinally spaced locations in the bore hole, picking up the potential difference between a point in the bore hole and a remote point, reducing the potential difference between said two points substantially to zero by passing current between two other longitudinally spaced locations in the bore hole between said two locations and the point in the bore hole, and obtaining indications of the potential difference between a reference point and a point in the bore hole between said two current passing locations.

6. In a method for investigating the electrical resistivity of earth formations traversed by a bore hole containing a column of electrically conductive liquid, the steps of passing current of known or constant intensity between one location in the bore hole and a remote point, picking up the potential difference between two longitudinally spaced apart points in the bore hole near said one location, reducing said potential difference by passing current between another location in the bore hole and a remote point, utilizing said potential difference to control the intensity of the current emitted at said another location so as to reduce said potential difference substantially to zero, and obtaining indications of the potential difference between a reference point and a point separated longitudinally from said two spaced apart points by one of said locations.

7. In a method for investigating the electrical resistivity of earth formations traversed by a bore hole containing a column of electrically conductive liquid, the steps of passing current of known or constant intensity between two longitudinally spaced locations in the bore hole, picking up the potential difference between a point in the bore hole and a remote point, reducing said potential difference by passing current between two other longitudinally spaced locations in the bore hole, utilizing the potential difference to control the intensity of the current emitted at said two other locations so as to reduce the potential difference substantially to zero, and obtaining indications of the potential difference between a reference point and a point in the bore hole between the two current passing locations.

8. In a method for investigating the electrical resistivity of earth formations traversed by a bore hole containing a column of electrically conductive liquid, the steps of passing current of known or constant intensity between one location in the bore hole and a remote point, obtaining indications of the potential difference between two points in the bore hole near said one location that are spaced apart in a direction longitudinally of the bore hole with respect to said one location and in the path of current flowing therefrom, establishing an electric field distribution near said points in the bore hole, adjusting the intensity and polarity or phase of said electric field distribution so as to maintain said potential difference substantially at zero, and obtaining indications of the potential difference between a reference point substantially at ground potential and a point in the bore hole separated longitudinally from said two spaced apart points by said one location.

9. In well logging apparatus, the combination of a first electrode adapted to be lowered into a bore hole, electric source means connected to said electrode and to a point longitudinally spaced therefrom for passing current of constant or known intensity through said electrode into the surrounding earth formations, a second electrode longitudinally spaced from and mounted in fixed relation to said first electrode, electric source means connected to said second electrode and to a point longitudinally spaced therefrom for supplying current to said second electrode to reduce substantially to zero the potential difference between a pair of spaced points, a third electrode near said first and second electrodes and longitudinally spaced from and mounted in fixed relation to said electrodes, said third electrode being separated from said pair of points by one of said electrodes, and means for providing indications of the potential difference between said third electrode and a reference point longitudinally spaced apart therefrom.

10. In well logging apparatus, the combination of at least three longitudinally spaced apart electrodes mounted in fixed relation adapted to be lowered into a bore hole, electric source means connected to a first of said electrodes and to a point longitudinally spaced apart therefrom for passing current of known or constant intensity through said electrode into the surrounding earth formations, electric source means responsive to the potential difference between two longitudinally spaced apart points to pass current through a second of said electrodes and points longitudinally spaced apart therefrom to reduce said potential difference substantially to zero, the third electrode being near said first and second electrodes and separated longitudinally from said two spaced points by one of said first and second electrodes, and means for providing indications of the potential difference between said third electrode and a reference point longitudinally spaced apart therefrom.

11. In well logging apparatus, the combination of an electrode adapted to be lowered into a bore hole, electric source means connected to said electrode and to a remote point longitudinally spaced apart therefrom for passing current of known or constant intensity through said electrode into the surrounding earth formations, energized electrical means for establishing an electrical field distribution near said electrode in the bore hole to reduce substantially to zero the potential difference between a pair of longitudinally spaced apart points near said electrode, and means for providing indications of the potential difference between a measuring point and a reference point longitudinally spaced apart therefrom, said measuring point being near said electrode and longitudinally spaced from said pair of points by said electrode.

12. In well logging apparatus, the combination of at least five longitudinally spaced apart electrodes adapted to be lowered into a bore hole, electric source means connected to one of said electrodes and a remote point longitudinally spaced apart therefrom for passing current of known or constant intensity through said one electrode into the surrounding earth formations, electric source means responsive to the potential difference between two other of said electrodes for passing current between the fourth of said electrodes and a remote point longitudinally spaced apart therefrom to reduce said potential difference substantially to zero, the fifth electrode being positioned in the bore hole near said first electrode and being separated from said two other electrodes by said first electrode, and means for providing indications of the potential difference between said fifth electrode and a reference point longitudinally spaced apart therefrom.

13. In well logging apparatus, the combination of at least six longitudinally spaced apart electrodes mounted in fixed relation and adapted to be lowered into a bore hole, electric source means connected to the first and second of said electrodes for passing current of known or constant intensity through said electrodes into the surrounding formations, electric source means responsive to the potential difference between a third of said electrodes and a remote point longitudinally spaced apart therefrom for passing current between fourth and fifth of said electrodes to reduce said potential difference substantially to zero, the sixth of said electrodes being positioned between said first and second and fourth and fifth electrodes, and means for providing indications of the potential difference between said sixth electrode and a reference point longitudinally spaced apart therefrom.

14. In well logging apparatus, the combination of at least six longitudinally spaced apart electrodes mounted in fixed relation and adapted to be lowered into a bore hole, electric source means connected to one of said electrodes and to a remote point longitudinally spaced apart therefrom for passing current of known or constant intensity through said one electrode into the surrounding earth formations, electric source means responsive to the potential difference between two other of said electrodes for passing current between a fourth of said electrodes and a remote point longitudinally spaced apart therefrom to reduce said potential difference substantially to zero, fifth and sixth of said electrodes being positioned in the bore hole near said first electrode and being separated from said two other electrodes by said first electrode and means for providing indications of the potential difference between said fifth and sixth electrodes.

15. In well logging apparatus, the combination of a first electrode adapted to be lowered into a bore hole, electric source means connected to said electrode and to a point longitudinally spaced therefrom for passing current of constant or known intensity through said electrode into the surrounding earth formations, a second electrode longitudinally spaced from and mounted in fixed relation to said first electrode, electric source means connected to said second electrode and to a point longitudinally spaced therefrom for passing current through said second electrode into the surrounding earth formations, a pair of longitudinally spaced apart points at potentials determined by the currents passing through the first and second electrodes, the potential difference between the spaced points in response to current flow through the first electrode opposing the potential difference between the spaced points in response to current flow through the second electrode to impede materially the flow of current from the first electrode along the bore hole in the direction of said second electrode, a third electrode near said first and second electrodes and longitudinally spaced from and mounted in fixed relation to said electrodes, said third electrode being separated from said pair of spaced points by one of said electrodes, and means for providing indications of the potential difference between said third electrode and a reference point longitudinally spaced apart therefrom.

16. In a well logging apparatus, the combination of an electrode adapted to be lowered into a bore hole, electric source means connected to said electrode and to a remote point longitudinally spaced apart therefrom for passing current of known or constant intensity through said electrode into the surrounding earth formations to establish a first electrical field distribution affecting the potential difference between a pair of longitudinally spaced apart points near said electrode, energized electrical means for establishing a second electrical field distribution near said electrode in the bore hole affecting the potential difference between said spaced apart points, the first and second electrical fields tending to create opposing potential differences between said spaced apart points to impede materially the flow of current from said first electrode along the bore hole past the spaced apart points, and means for providing indications of the potential difference between a measuring point and a reference point longitudinally spaced apart therefrom, said measuring point being near said electrode and longitudinally spaced from said pair of points by said electrode.

17. In well logging apparatus, the combination of at least five longitudinally spaced apart electrodes adapted to be lowered into a bore hole, electric source means connected to the first of said electrodes and a point longitudinally spaced apart therefrom for passing current of known or constant intensity through said first electrode into the surrounding earth formations, the potential between two other of said electrodes being influenced by the current passed through said one electrode, electric source means for passing current between the fourth of said electrodes and a point longitudinally spaced apart therefrom to influence the potential difference between the two other electrodes in a sense opposite to that of the current passed through said first electrode to impede materially the flow of current from the first electrode along the bore hole in the direction of the fourth electrode, the fifth electrode being positioned in the bore hole near said first electrode and being separated from said two other electrodes by said first electrode, and means for providing indications of the potential difference between said fifth electrode and a reference point longitudinally spaced apart therefrom.

References Cited in the file of this patent

UNITED STATES PATENTS

| 1,819,923 | Schlumberger | Aug. 18, 1931 |
| 2,347,794 | Piety | May 2, 1944 |
| 2,446,303 | Owen | Aug. 3, 1948 |
| 2,592,125 | Doll | Apr. 8, 1952 |
| 2,619,520 | Nichols | Nov. 25, 1952 |
| 2,752,561 | Gillies | June 26, 1956 |

FOREIGN PATENTS

| 691,721 | Great Britain | May 20, 1953 |